(No Model.)
J. COLLINS.
BACK BAND TRACE CARRIER.
No. 402,399. Patented Apr. 30, 1889.
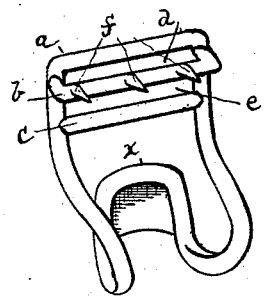
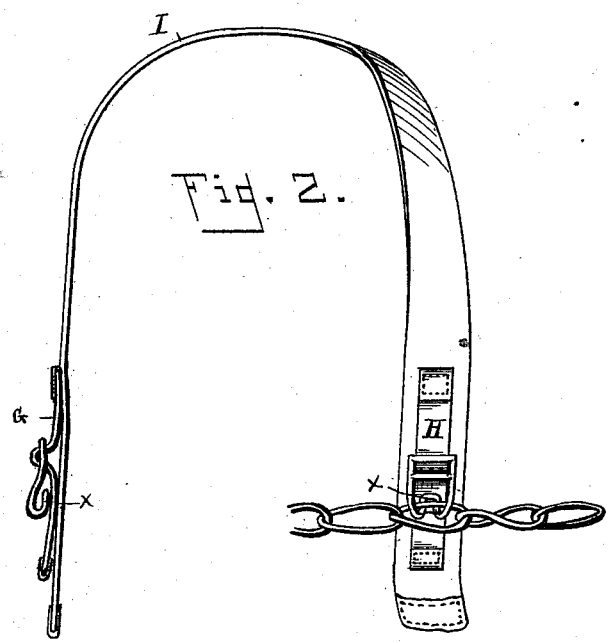
Witnesses.
Warren C. Stone
R. S. Williams
Inventor
Joseph Collins
By his Attorney H. N. Jenkins

United States Patent Office.

JOSEPH COLLINS, OF NEW ORLEANS, LOUISIANA.

BACK-BAND TRACE-CARRIER.

SPECIFICATION forming part of Letters Patent No. 402,399, dated April 30, 1889.

Application filed October 27, 1888. Serial No. 289,301. (No model.)

*To all whom it may concern:*

Be it known that I, JOSEPH COLLINS, a citizen of the United States, and a resident of New Orleans, parish of Orleans, State of Louisiana, have invented new and useful Improvements in a Back-Band Trace-Carrier, of which the following is a full and exact description, reference being had to the accompanying drawings, making part of this specification.

My invention consists in a slide or buckle having slots therein for the reception of a back-band, projecting spurs whereby the device is more securely held at any desired height on said band, and a flat inwardly and upwardly turned hook for carrying the trace-chains, as hereinafter more fully set forth.

My invention also consists in the combination of a back-band having straps secured to the sides of same with slides or buckles having slots therein and projecting spurs for securely holding same on the straps and having their lower ends terminating in an inwardly and upwardly turned hook for carrying the trace-chains, as hereinafter described.

The object of my invention is to provide means for carrying the trace-chains in such manner as to prevent their being jostled off the hook or becoming entangled with the trace-chains of a horse's mate, as well as to protect the hair and hide of the animal from being chafed.

My improvements will be readily understood by referring to the accompanying drawings, whereon—

Figure 1 represents a perspective view of the buckle complete. Fig. 2 shows my back-band with slides or buckles thereto attached.

The upper part of my slide or buckle is preferably made of three bars, $a\ b\ c$, with spaces $d\ e$ between same for the passage of the straps of a back-band, as hereinafter fully described. The middle bar, $b$, is provided with a series of outwardly-projecting spurs, $f$, for engaging the back-band straps and thus securely hold the device at any adjusted position thereon.

The sides of the slide or buckle extend downwardly and terminate in a single flat inwardly and upwardly turned hook having a connecting-web for producing a broad flat surface, as shown at $x$.

The back-band I is preferably composed of three thicknesses of eight-ounce duck stitched securely together, and having ends tipped with leather to prevent fraying. To the outer surface and at opposite sides of the back-band are stitched or otherwise secured the straps G H, on which are fitted the slides or buckles, with their hook portions resting against the lower part of their respective straps, which, together with the back-band proper, forms a pad or shield, whereby the trace-chains are prevented from coming in contact with the animal's sides.

From the above description it will be seen that the trace-chains cannot be jostled from the hooks or become entangled with those of a horse's mate, and that the body of the back-band serves as a guard to prevent either the buckles or chains from rubbing against the animal's sides.

Having described my invention, what I claim as new, and desire to secure by Letters Patent, is—

The within-described back-band buckle consisting of the bars $a\ b\ c$, having spaces $d\ e$ between the same, the bar $b$, provided with outwardly-projecting spurs $f$, and the sides of the buckle projecting downward, thence inwardly, and having a connecting-web to form a broad flat hook, $x$, substantially as and for the purpose specified.

In testimony whereof I affix my signature in presence of two witnesses.

JOSEPH COLLINS.

Witnesses:
WM. CREEVY,
V. G. REHENTISCH.